US005768897A

United States Patent [19]
Rainville et al.

[11] Patent Number: 5,768,897
[45] Date of Patent: Jun. 23, 1998

[54] AIR DRYING APPARATUS AND METHOD WITH HIGH RATIO GAS FLOW TO ABSORBER WEIGHT

[75] Inventors: Donald D. Rainville, Manassas; Robert R. Crawford; Roderick W. Lyman, both of Stafford, all of Va.

[73] Assignee: Universal Dynamics Corporation, Woodbridge, Va.

[21] Appl. No.: 397,034

[22] Filed: Feb. 27, 1995

Related U.S. Application Data

[63] Continuation of Ser. No. 192,074, Feb. 4, 1994, abandoned, which is a continuation of Ser. No. 899,555, Jun. 16, 1992, abandoned.

[51] Int. Cl.[6] .................................................. F25D 17/06
[52] U.S. Cl. ................................................ 62/94; 62/271
[58] Field of Search .......................................... 62/94, 271

[56] References Cited

U.S. PATENT DOCUMENTS

| | | | |
|---|---|---|---|
| 4,711,097 | 12/1987 | Besik | 62/271 |
| 4,723,417 | 2/1988 | Meckler | 62/271 |
| 4,761,968 | 8/1988 | Basseen et al. | 62/271 |
| 4,793,143 | 12/1988 | Rhodes | 62/93 |
| 4,887,438 | 12/1989 | Meckler | 62/271 |

OTHER PUBLICATIONS

G. Lukchis, Adsorption Systems, *LINDE Molecular Sieves Adsorbent Bulletin* (reprinted from *Chemical Engineering*, Jun. 11, 1973, Jul. 9, 1973 & Aug. 16, 1973).
Whitlock, Inc., "Drying Systems", Bulletin No. 7-105.1 (1973).
Walton/Stout, Inc., "Plastic Dryers by WS", No Date.
Novatec, Inc., "New Micro Dryer Series: MD-50 & MD-50A", Bulletin MD-50 Jun. 1989.
Novatec, Inc., "Micro Dryer Series: MD-15, MD-25 & MD-25A", Bulletin MD-10, rev. Jun. 1987.
Thoreson McCosh Inc., "Self Regenerating High Efficiency Plastic Materials Drying Systems For Plastics Molders and Extruders" (1982).
Conair, Inc., "Dehumidifying Dryers and Preheaters", Form No. 9300 SEN Jul. 1987.
Universal Dynamics Corporation, "UDC-50 Automatic Mini-Dryer", UDC-BUL (Jan. 1990).
Universal Dynamics, Inc., "Dehumidifying Hopper Dryers, DHD Series" (No date).

*Primary Examiner*—Ronald C. Capossela
*Attorney, Agent, or Firm*—William H. Murray; Robert E. Rosenthal

[57] ABSTRACT

An apparatus for dehumidifying air includes a first air path having a first opening, a second opening, and a first desiccant mass intermediate the first and second opening, a second air path, having a first opening, a second opening, and a second desiccant mass intermediate the first and second opening, and an apparatus for causing air selectively from either the first air path or the second air path to flow to an outlet of the apparatus, wherein the ratio of the weight of each of the desiccant masses to the air flow rate into the apparatus outlet is about 1 pound of desiccant for each 10 to 20 cubic feet per minute of air flow. A controller adjusts regeneration heating times based on detected dew point before switching between air paths and detected temperature after switching air paths.

6 Claims, 8 Drawing Sheets

AIR DRYING APPARATUS AND METHOD WITH HIGH RATIO GAS FLOW TO ABSORBER WEIGHT

This is a continuation of application Ser. No. 08/192,074 filed on Feb. 4, 1994 now abandonded, which is a continuation of application Ser. No. 07/899,555 filed on Jun. 16, 1992 now abandonded.

BACKGROUND OF THE INVENTION

This invention relates to air dryers, and in particular to air dryer systems employing desiccants for removing water from the air before introduction of the air into the material to be dried.

Conventional air drying methods and systems, particularly for drying materials in particulate or granular form, such as plastics and grains, include a desiccant for adsorbing water from the air before introduction of the air into the material to be dried. A variety of commercially available desiccants may be used in this type of air dryer. After operation of the air dryer for a period of time, the desiccant will begin to approach its saturation point, and will be ineffective in removing moisture from the air. As a result, the desiccant must be removed from the stream of air used in the processing apparatus to dry the material, and must be itself dried of retained moisture. A fresh desiccant must be provided to dry the air stream.

In order to provide for periodic drying of the desiccant, the twin tower method and apparatus has been developed. According to the twin tower method and apparatus, there is provided a dryer having two air paths, or towers, each having an air inlet, an air outlet, and a quantity of desiccant intermediate the inlet and the outlet. The two air paths or towers are maintained separate by appropriate valving. An appropriate system of piping and valves is provided so that air from either one or the other tower will be directed to an outlet of the dryer. In a twin tower air dryer there is provided a flow of heated air through the tower that is not in use to dry, or regenerate, the desiccant in that tower. The temperature and flow rate are selected so that the desiccant is completely regenerated when the desiccant in the other tower has started to reach saturation.

In a typical prior art twin tower system for handling an air flow rate of 50 cubic feet per minute (CFM), each tower will contain approximately 28 pounds of desiccant. The ratio of air flow rate to desiccant weight is about 2 CFM per pound of desiccant. Typically, the system will be operated to switch between towers at an interval of at least one and one-half hours. It has been believed that an advantage associated with cycle times of two hours or more is that a given desiccant can only be cycled between a saturated and a dry state a certain number of times.

There are a number of disadvantages associated with twin tower gas absorption systems, or twin tower air dryers, as described above. The density of the desiccant is very low, for example, about 40 pounds per cubic foot. A twin tower system requiring 28 pounds of desiccant in each tower accordingly has a large volume. Typically, such a system will be sold as a unit and housed in a cabinet. The typical size of such a cabinet is roughly five feet in height, and three feet in width and depth. It will be appreciated that there are many demands on floor space in facilities, such as injection molding operations, that use twin tower absorption systems. As a result, the large size of these systems is a disadvantage.

The typical twin tower dryers in the prior art also consume energy at a relatively high rate. Conventional electric air heaters employed in such systems typically have a minimum power consumption of about 3 kilowatts.

Dryers having three or more towers have also been used in the prior art. Such dryers have a lower ratio of desiccant mass to air flow rate than prior art twin tower systems. Typically, such dryers use more than one tower at one time, resulting in high power consumption. Such systems also occupy a large amount of valuable space in processing areas.

It is accordingly an object of this invention to provide a twin tower air drying system adapted to have a smaller size than prior art systems.

It is a further object of the invention to provide a twin tower air drying system having lower power consumption than prior art systems.

Additional objects and advantages of an apparatus and method of the invention will become apparent from the detailed description below.

SUMMARY OF THE INVENTION

A method for dehumidifying air and providing dehumidified air to an outlet includes the step of continuously causing air selectively from either a first air path or a second air path to flow to the outlet so as to maintain a continuous flow of dehumidified air into the outlet, wherein the first air path is characterized by having a first opening, a second opening, and a first desiccant mass intermediate the first opening and the second opening, wherein the second air path is characterized by having a first opening, a second opening, and a second desiccant mass intermediate of the first opening and the second opening, and wherein a ratio of the weight of both the first desiccant mass and the second desiccant mass to the outlet is not greater than about one pound per 10 cubic feet per minute.

An apparatus for dehumidifying air and providing dehumidified air to an outlet includes a first air path, having a first opening, a second opening, and a first desiccant mass intermediate the first opening and the second opening, a second air path, including a first opening, a second opening, and a second desiccant mass intermediate the first opening and the second opening, and means for continuously causing air selectively from either the first air path only or the second air path only to flow to the outlet, so as to maintain a continuous flow of dehumidified air into the outlet, wherein the ratio of the weight of each of the first desiccant mass and the second desiccant mass to the air flow rate into the outlet is not greater than about one pound per 10 cubic feet per minute.

DETAILED DESCRIPTION OF A PREFERRED EMBODIMENT

Figure 1:
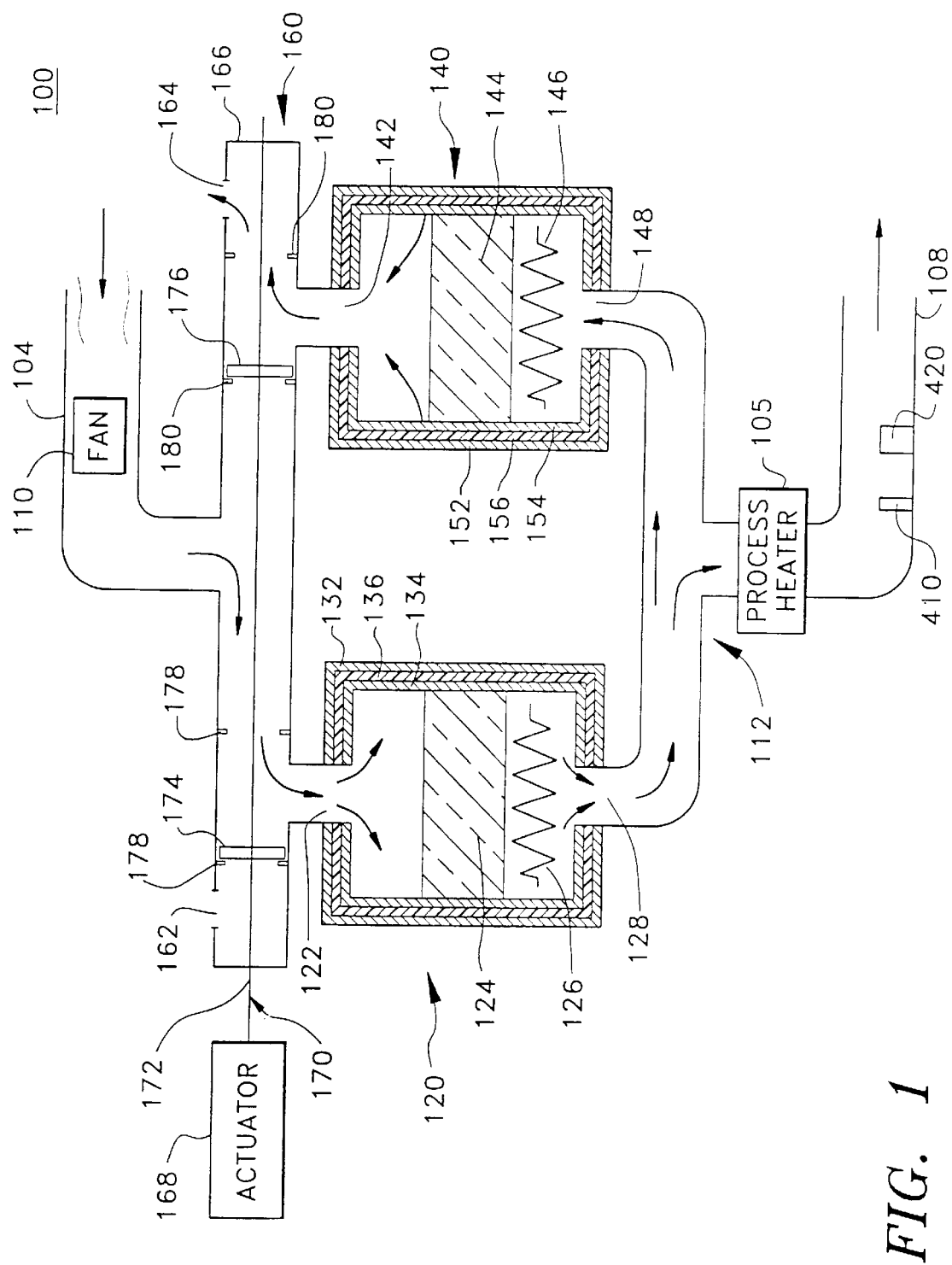
FIG. 1 is a partially schematic view of an apparatus according to the invention.

There will now be described, with reference to FIG. 1, a method and apparatus according to an embodiment of the invention. FIG. 1 is a partially schematic view of an air dryer or air drying system 100 according to the invention. Air dryer 100 has an air inlet 104 and an air outlet 108. In operation, air inlet 104 and air outlet 108 would each be connected with a process apparatus (not shown) which contains material which is to be dried, or to be maintained in a dry state. Air inlet 104 is thus a source of air flow into dryer 100. Intermediate air inlet 104 and air outlet 108 are provided first air path 120, or first tower 120, and second air path 140, or second tower 140. Inlet air handling assembly 160 is provided intermediate air inlet 104 and first air path 120 and second air path 140. Outlet piping 112 is provided intermediate air outlet 108 and first tower 120 and second tower 140.

First tower 120 has a first opening 122 at one end thereof and a second opening 128 at an opposite end thereof. Desiccant mass or desiccant bed 124 and heater 126 are provided intermediate first opening 122 and second opening 128. First tower 120 desirably has a substantially cylindrical form, having an exterior metal wall 132, preferably of aluminum, an interior metal foil liner 134, also preferably of aluminum, and an insulating layer 136, preferably of ceramic, disposed intermediate exterior wall 132 and liner 134. It has been found adequate to use a ceramic with a thickness of approximately one-half inch, which ceramic is capable of maintaining a temperature differential of about 400° F.

Second tower 140 has a first opening 142 at one end thereof, and a second opening 148 at an opposite end thereof. Second desiccant mass or desiccant bed 144 and heater 146 are disposed intermediate first opening 142 and second opening 148. Second tower 140 may also be a substantially cylindrical structure having an exterior metal wall 152, preferably of aluminum, an interior metal foil liner 154, also preferably of aluminum and an insulating layer 156, preferably of ceramic, disposed intermediate exterior wall 152 and liner 154. The thickness and selection of materials for the insulating layer 156 may be the same as for insulating layer 136 of first tower 120.

First desiccant 124 and second desiccant 144 may be any one of a number of materials used as desiccants in the art. A preferred desiccant is molecular sieve, which is commercially available from a number of sources. Other materials which may be used as a desiccant include silica gel and activated alumina.

The quantity of desiccant is preferably about one pound of desiccant for each 10 to 20 CFM of air flow through air dryer 100. For example, if dryer 100 has an air flow rate of 50 CFM, then the weight of each desiccant 124 and 144 will be in the range of 2½ to 5 pounds. In a preferred embodiment of a system having an airflow rate of 50 CFM, the weight of each desiccant 124 and 144 may be about 3 pounds. In a system having an air flow rate of 30 CFM, the weight of each desiccant 124 and 144 is preferably in the range from about 1½ to about 3 pounds. In a preferred embodiment of a system having an air flow rate of 30 CFM, the desiccant mass may be about 2 pounds. In principle, the ratio of the mass of the desiccant to air flow rate may be even less than the lower limits indicated above. A ratio of 1 pound of desiccant to as much as 50 CFM of air flow may be achievable.

Heater 126 in first tower 120 and heater 146 in second tower 140 may each be conventional electric air heaters. These heaters may have a substantially smaller maximum power consumption than those in prior art dryers. For example, in a dryer having a flow rate of 50 CFM, and a desiccant weight in each tower of 3 pounds, a capacity of 1.5 kilowatts has been found to be adequate.

Air switching assembly 160 will now be described. Switching assembly 160 serves to provide a connection for the flow of air between air inlet 104 and selectively one of first opening 122 of first tower 120 and first opening 142 of second tower 140. Air switching assembly 160 also serves to connect the one of first opening 122 of first tower 120, and first opening 142 of second tower 140, that is not connected to air inlet 104, to a vent to air outside dryer 100.

Air switching assembly 160 comprises a plenum 166. Plenum 166 is a generally cylindrical pipe having closed ends. Plenum 166 has openings therein with sealed connections to air inlet 104, first opening 122 of first tower 120, and first opening 142 of second tower 140. There is provided along the major axis of plenum 166 a valve rod assembly 170, comprising a rod 172 with first stop 174 and second stop 176 disposed thereon. Rod 172 is disposed through apertures provided in each end wall of plenum 166. A valve actuator 168 is attached to one end of rod 172 to provide movement of rod 172 within air plenum 166.

The opening in plenum 166 to air inlet 104 is substantially at the midpoint of plenum 166. To a first side thereof there is disposed a connection to first opening 122 of first tower 120. There is disposed to a second, opposite side of the connection to air inlet 104 a connection to first opening 142 of second tower 140. Intermediate the connection to first opening 122 of first tower 120 and the adjacent end wall of plenum 166 there is provided first vent 162 to the exterior of the air dryer 100. Similarly, intermediate the connection to first opening 142 in second tower 140 and the opposite end wall of plenum 166 there is provided second vent 164 to the exterior of air dryer 100.

There are provided on the interior surface of air plenum 166, on either side of the opening to first opening 122 of first tower 120, a pair of circumferential inwardly-projecting first flanges 178. First stop 174 is disposed on valve rod 172 intermediate first flanges 178. First flanges 178 and first stop 174 are so dimensioned and configured that when first stop 174 is brought in firm contact with either of first flanges 178, an air tight seal is formed.

Similarly, on the interior surface of plenum 166, immediately to either side of the connection to first opening 142 of second tower 140 there are provided circumferential inwardly-projecting second flanges 180. Second stop 176 on rod 172 is provided intermediate second flanges 180. Second stop 176 and second flanges 180 are so configured and dimensioned, that by appropriate movement of rod 172, second stop 176 may be brought into sealing contact with either of second flanges 180 to provide an air tight seal.

Second opening 128 of first tower 120 and second opening 148 of second tower 140 are connected together and to dryer outlet 108 by a T-junction 112. T-junction 112, and its extensions, provide a sealed, permanent physical communication among second opening 128 of first tower 120, second opening 148 of second tower 140 and dryer outlet 108.

Figure 8:
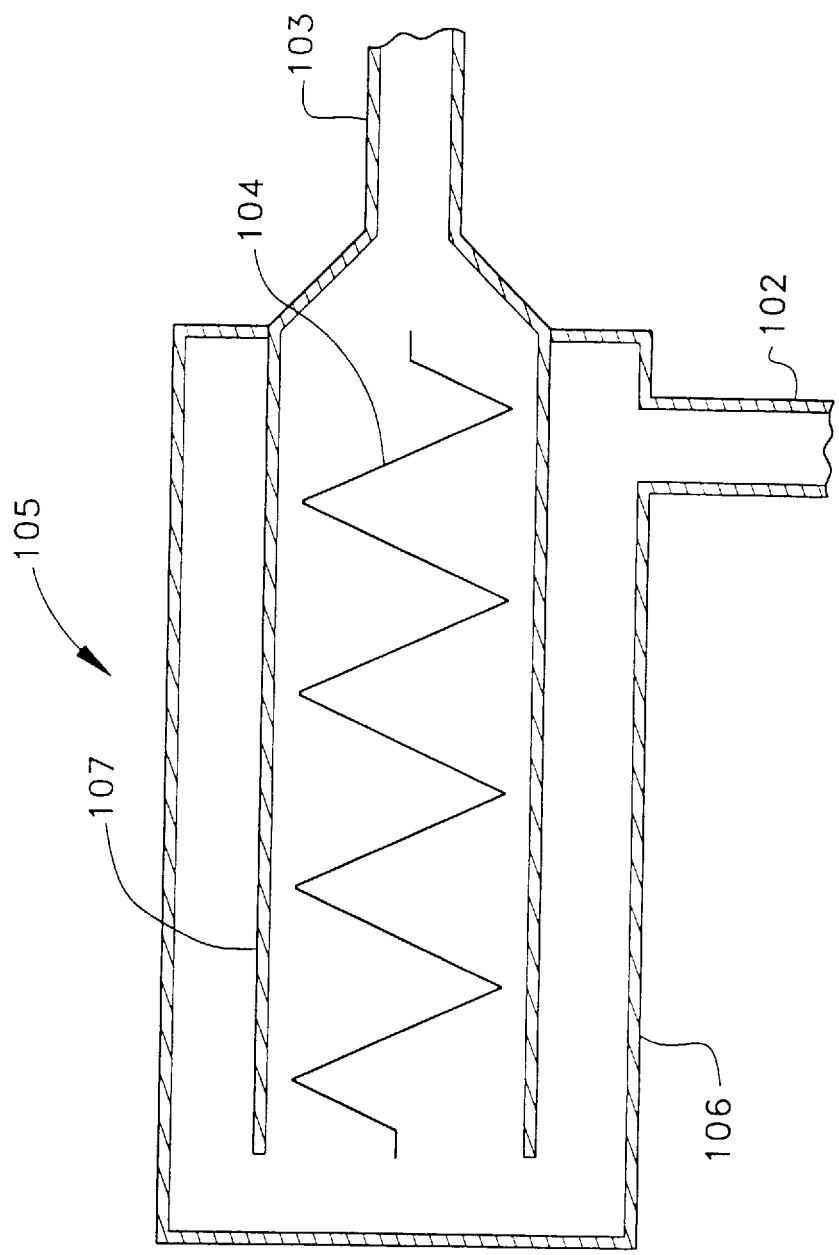
FIG. 8 is a partially-schematic cross-sectional view of a heater in an apparatus according to the invention.

Intermediate T-junction 112 and outlet 108 there is disposed process heater 105. Process heater 105 is so configured as to provide good heat exchange between process heater 105 and the air stream. Process heater 105 is also configured so as to radiate heat to the exterior of dryer 100. Referring to FIG. 8, for example, process heater 105 may comprise a substantially conventional heater having two coaxial cylindrical metal tubes, 106, 107 with a heater element 104 disposed along the axis thereof. Air inlet 102, in outer tube 106, and air outlet 103, in central tube 107, are disposed so that air flows between the two tubes and then interior to central tube 107. In a preferred embodiment, the outer tube 106 has a diameter of about 6 inches and a length of about 10½ inches, and the central tube 107 has a diameter of about 4½ inches and a length of about 9½ inches. The outer tube 106 is preferably of aluminum sheet having a thickness of about 0.060 inches. The inner tube 107 may be of stainless steel, for example.

Referring again to FIG. 1, there are provided intermediate process heater 105 and dryer outlet 108, temperature sensor 410 and dew point sensor 420. Temperature sensor 410 detects the temperature of air exiting dryer 100, and dew point sensor 420 detects the dew point of air exiting dryer 100. Temperature sensor 410 may be, for example, a thermocouple. Dew point sensor 420 may be, for example, a lithium chloride sensor cell. Other conventional dew point and temperature sensors may be used. As shown, there is provided fan or blower 110 to provide a flow of air within air dryer 100 from inlet 104 to outlet 108. In the embodiment shown, fan 110 is provide immediately inward or downstream of air inlet 104.

The operation of dryer 100 will now be explained. In the configuration shown in FIG. 1, air from a process apparatus (not shown) enters dryer 100 through inlet 104. Air at inlet 104 is caused to move in the direction of the arrows through dryer 100 by fan 110. The air stream enters air plenum 166. Valve rod assembly 170 is so disposed, by the positioning of first stop 174 in sealing contact with one of first flanges 178, as to provide communication, through air plenum 166, between air inlet 104 and first opening 122 of first tower 120. As may be seen, valve rod assembly 170 is so disposed, by the positioning of second stop 176 in sealing contact with one of second flanges 180, that there is no direct communication between air inlet 104 and first opening 142 of second tower 140.

Air thus proceeds from plenum 166 into first tower 120. In first tower 120, air passes through first desiccant bed 124. In first desiccant bed 124, the moisture content of the air is reduced. Air then proceeds over first heater 126, which is not activated. Air then exits first tower 120 through second opening 128 and enters T-junction 112. Some of the air entering T-junction 112 proceeds to process dryer 105. During all or the greater part of the cycle, such as nineteen to twenty-one and one-half minutes of a twenty-two minute cycle, process heater 105 is activated, and heats the air stream. During the remaining time of the cycle, the air flow will cool the tubes of process heater 105. After passing through process heater 105, the air flow continues to air outlet 108. Conventionally, air outlet 108 will be connected to an air inlet of a processing apparatus (not shown). Dry air from the dryer will be used in the processing apparatus to dry material.

The remaining air entering T-junction 112 flows into second tower 140 through second opening 148. The air first passes over second heater 146. Second heater 146 is activated, for a selected time, to raise the temperature of the air to a higher level than the temperature of the air that flows to outlet 108. As explained below, second heater 146 is generally activated for only a selected regeneration heater time during each cycle. Generally, second heater 146 will be turned off for a selected cool down time, so that the temperature of second desiccant 144 is reduced somewhat and, depending on the type of material to be dried, may not be excessive when the air paths are switched. The air, after passing over heater 146, flows through second desiccant 144. The air flowing through second desiccant 144 performs a drying, or regeneration, function. Moisture that has been adsorbed by second desiccant 144 during a prior step, is evaporated or released back into the air stream, thereby drying second desiccant 144. After the air stream has passed through second desiccant 144, the air stream exits second tower 140 through second opening 148. The air stream then enters air plenum 166. As noted above, valve rod assembly 170 is so configured to provide physical communication, through plenum 166, between first opening 142 and second vent 164. The air is thereby allowed to exit the air dryer 100 through second vent 164. Insulating layer 156 in second tower 140 prevents heat from being transferred from second desiccant 144 to exterior wall 152 of second tower 140. As a result, exterior wall 152 of second tower 140 will not be heated and cooled together with desiccant 124. Consequently, there will be energy savings, and it will be possible to heat and cool the desiccant more quickly.

It will be understood that, after operation in the configuration shown in FIG. 1, first desiccant 124 will begin to approach a saturation point. As a result, first desiccant 124 will be less effective in removing moisture from the air stream. A humidity threshold level, or a dew point threshold may be assumed to occur after a selected period of time, or after a dew point, in excess of a predetermined threshold is detected by dew point sensor 420. Of course, either dew point sensors or humidity sensors may be provided at any point in the air stream downstream of first tower 120. When either the predetermined time, or the predetermined dew point is reached, valve actuator 168 is operated. As explained below in connection with FIG. 4, a controller is desirably provided to signal actuator 168 to operate at the proper time. Valve actuator 168 moves rod 172 so as to cause first stop 174 and second stop 176 to move to the opposite side of the connections in plenum 166 for first tower 120 and second tower 140, respectively. As a result, the air stream from air inlet 104 will be directed through plenum 166 to second tower 140. A portion of the air stream, after exiting second tower 140, will flow to outlet 108. Another portion of the air stream will flow into first tower 120 and then through plenum 166 to first vent 162. Thus, regenerated second desiccant 144 will remove moisture from the air stream, while first desiccant 124 is regenerated. First heater 126 will be activated to raise the temperature of the air in first tower 120 sufficiently to obtain regeneration of first desiccant 124. Insulating layer 136 will prevent heat from first desiccant 124 from heating wall 132 of first tower 120. When the air stream first enters second desiccant 144, the temperature of the air stream will be increased, if the temperature of second desiccant 144 is above the air stream temperature. It will be noted that heater 146 is not activated at this time. If the temperature of air exiting second desiccant bed 144 is excessive, damage to materials may occur. The temperature of air exiting outlet 108 must frequently be kept relatively low, for example, when particulate plastic material is being dried or maintained at a selected low moisture content. Plastic material presents a risk, if the temperature becomes too high, that individual particles will become sticky and fail to flow as required for processing operations. It is desirable to regenerate conventional desiccants at temperatures such as 600° F., which is far in excess of normal process temperature. As noted above, the metal portions of process heater 105 have been cooled, if desired, immediately prior to the changeover. Consequently, the metal portions of process heater 105 will act as a heat sink, cooling the air stream. Process heater 105 will also tend to radiate heat outside of dryer 100.

Figure 2:
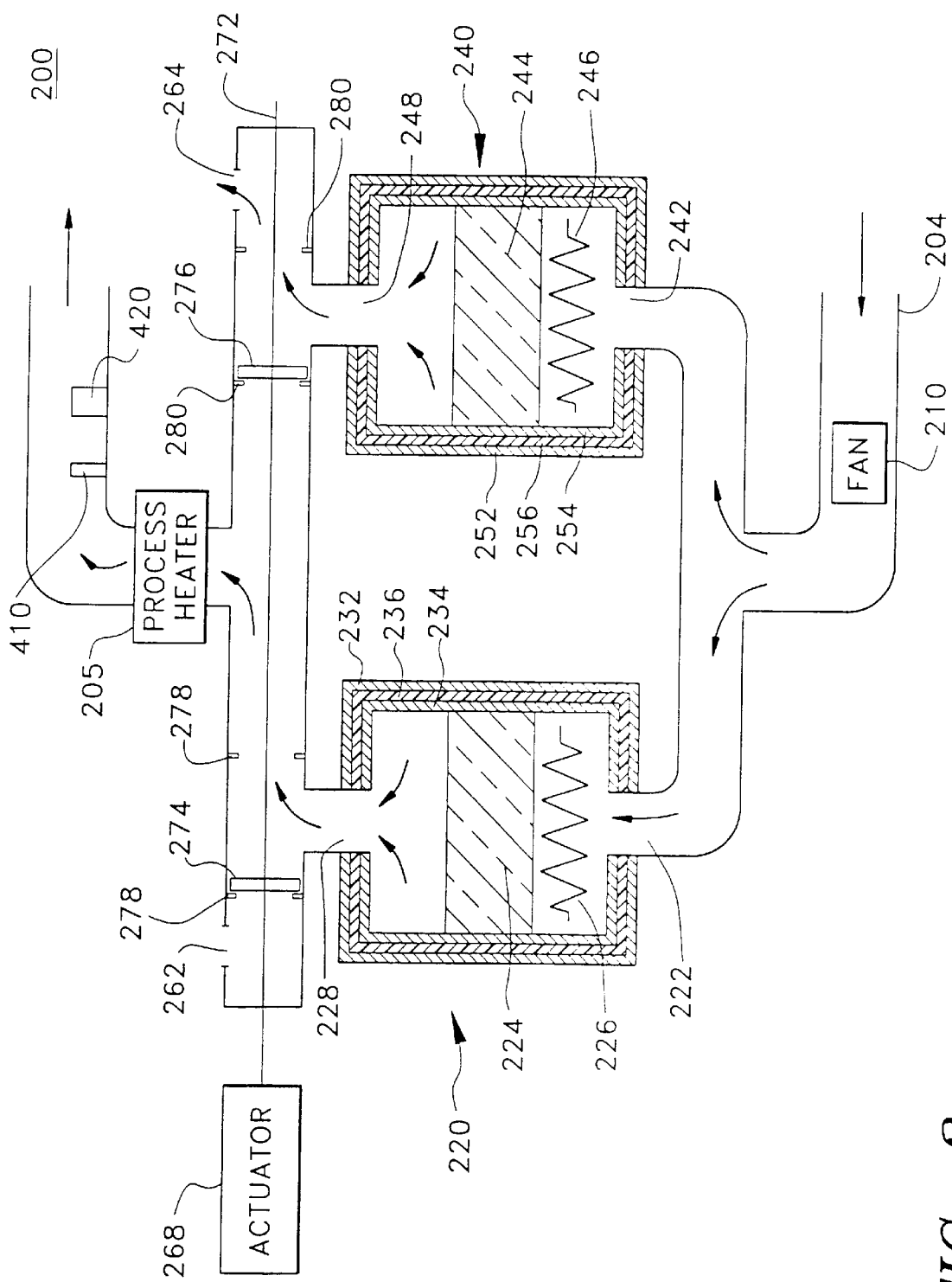
FIG. 2 is a partially schematic view of an apparatus according to an alternate embodiment of the invention.

There will now be described, with reference to FIG. 2, a method and apparatus according to an alternative embodiment of the invention. FIG. 2 is a partially schematic view of an air dryer or air drying system 200 according to the invention. Air dryer 200 has an air inlet 204 and an air outlet 208. In operation, air inlet 204 and air outlet 208 are each connected, so as to be in physical communication with a process apparatus (not shown) which contains material which is to be dried, or is to be maintained in a dry state. Air inlet 204 is thus a source of air flow into dryer 200. Intermediate air inlet 204 and air outlet 208 are provided first air path 220 or first tower 220, and second air path 240, or second tower 240. Inlet piping 212 is provided intermediate air inlet 204 and first tower 220 and second tower 240. Air switching assembly 260 is provided intermediate first tower 220 and second tower 240, and air outlet 208.

First tower 220 has a first opening 222 at one end thereof and a second opening 228 at an opposite end thereof. First desiccant mass or desiccant bed 224 and heater 226 are provided intermediate first opening 222 and second opening 228. First tower 220 has a substantially cylindrical side wall, and a base and top, with first opening 222 and second opening 228 provided in the base and top surface, respectively, of the cylinder. The walls of the cylinder include an exterior metal wall 232, preferably of aluminum, interior metal foil liner 234, also preferably of aluminum and an insulating layer 236, preferably of ceramic, disposed intermediate exterior wall 232 and liner 234. As explained above in connection with FIG. 1, insulating layer 236 is preferably a one-half inch thick ceramic layer which can sustain a temperature differential of 400° F.

Second tower 240 has a first opening 242 at one end thereof, and a second opening 248 at an opposite end thereof. Second desiccant mass or desiccant bed 244 and second heater 246 are disposed intermediate first opening 242 and second opening 248. Second tower 240 may also be a substantially cylindrical structure having a metal wall, with first opening 242 provided in the base thereof, and second opening 248 provided in the top surface thereof. Second tower 240 includes an exterior cylindrical metal wall 252, preferably of aluminum, an interior metal foil liner 254, also preferably of aluminum, and an insulating layer 256, preferably of ceramic, disposed intermediate exterior wall 252 and liner 254. Insulating layer 256 is preferably identical to be insulating layer 236 of first tower 220.

First desiccant 242 and second desiccant 244 may be one of a number of materials used as desiccants in the art. As with the embodiment of FIG. 1, molecular sieve is a preferred desiccant.

The quantity of desiccant in each tower is preferably about 1 pound of desiccant for each 10 to 20 CFM of air flow through air dryer 200. For example, if air dryer 200 has a capacity of 50 CFM, then the weight of each desiccant 224 and 244 will be in the range of 2½ to 5 pounds. In a preferred embodiment of a system having an air flow rate of 50 CFM, the weight of each desiccant 224 and 244 may be about 3 pounds. In a preferred embodiment of a system having an air flow rate of 30 CFM, the weight of each desiccant 224 and 244 is preferably in the range from 1½ to 3 pounds. In a preferred embodiment of a system having an air flow rate of 30 CFM, the desiccant weight may be about 2 pounds. As noted above in the discussion of FIG. 1, in principle, the ratio of the mass of the desiccant to the air flow rate may be even less than the lower limits indicated above.

Heater 226 in first tower 220 and heater 246 in second tower 240 may each be conventional electric air heaters. The maximum power consumption of these air heaters in a system having a capacity of 50 CFM, and about 3 pounds of desiccant per tower, may be about 1.5 kilowatts.

Air switching assembly 260 will now be described. Air switching assembly 260 serves to provide a connection for the flow of air into air outlet 208 from, selectively, one of first opening 222 of first tower 220 and first opening 242 of second tower 240. Air switching assembly 260 also serves to connect the one of second opening 228 of first tower 220, and second opening 248 of second tower 240, that is not connected to air outlet 208, to a vent, so as to vent air outside the dryer 200.

Air switching assembly 260 comprises plenum 266. Plenum 266 may be, as illustrated, substantially a cylindrical tube having closed ends. Plenum 266 has openings therein having sealed connections to air outlet 208, second opening 228 of first tower 220, and second opening 248 of second tower 240. There is provided along the major axis of plenum 266 valve rod assembly 270. Valve rod assembly 270 includes a rod 272 with first stop 274 and second stop 276 disposed thereon.

The opening in plenum 266 to air outlet 208 is approximately at the midpoint of plenum 266. To a first side of the connection to air outlet 208 there is disposed the connection to second opening 228 of first tower 220. Disposed to a second, opposite side of the opening to air outlet 208 is an opening to second opening 248 of second tower 240. Intermediate the connection to first opening 228 of first tower 220 and the adjacent end of air plenum 266 there is provided first vent 262. First vent 262 provides a portion of plenum 266 in physical communication with the exterior of air dryer 200. Similarly, disposed intermediate the connection to second opening 248 of second tower 240 and an adjacent end of plenum 266 is provided second vent 264. Second vent 264 provides communication between the interior of plenum 266 and the exterior of air dryer 200.

There are provided on the interior surface of air plenum 266 immediately adjacent to and on either side of the connection to second opening 228 of first tower 220 a pair of circumferential inwardly-projecting first flanges 278. First stop 274 is disposed on valve rod 272 intermediate first flanges 278. First flanges 278 and first stop 274 are so dimensioned and configured that first stop 274 may be brought, by appropriate movement of valve rod 272, in sealing contact with either of first flanges 278, to form an air tight seal.

Similarly, immediately adjacent to and to either side of the connection between plenum 266 and second opening 248 of second tower 240 there are disposed circumferential inwardly-projecting second flanges 280. Second stop 276 on rod 272 is provided intermediate second flanges 280. Second stop 276 and second flanges 280 are so dimensioned and configured that, by appropriate motion of rod 272, second stop 276 may be provided in sealing contact with either of second flanges 280 to form an air tight seal. Valve actuator 268, which may be conventional in the art, is attached to one end of rod 272, exterior to plenum 266, to provide movement of rod 272 within plenum 266. It will be understood that rod 272 is disposed through apertures provided in each end wall of plenum 266.

First opening 222 of first tower 220 and first opening 242 of second tower 240 are connected together, and to outlet 208, by a T-junction 212. Thus, first opening 222 of first tower 220, first opening 242 of second tower 240, and outlet 208, are provided in permanent, sealed communication.

Intermediate T-junction 212 and outlet 208 there is disposed process heater 205. Process heater 205 is preferably identical to process heater 105 of FIG. 1. The outer tube of process heater 205, like the outer tube of process heater 105 of FIG. 1, is disposed so that its outer surface radiates outside dryer 200. Temperature sensor 410 and dew point sensor 420 are disposed intermediate process heater 205 and outlet 208.

The operation of dryer 200 will now be explained. In the configuration shown in FIG. 2, air enters dryer 200 through inlet 204. Fan 210 provides an air flow from inlet 204 through dryer 200. The air flow is split at the T-junction 212, and flows into both first tower 220 and second tower 240. In first tower 220, the air flow first enters through first opening 222 and flows over heater 226, which is not activated, and then through desiccant bed 220. The air flow is thereby dried to a desired degree of moisture content or a desired dew point. The air flow through second tower 240 enters through first opening 242 and flows to second tower heater 246 and then passes through second desiccant bed 244. It will be appreciated that second tower 240 is in a regeneration mode. Thus, heater 246 is activated to raise the air flow to a sufficiently high temperature to achieve a drying of desiccant bed 244. As explained in connection with FIG. 1, a heater in a tower during regeneration, such as heater 246, is only activated during a selected regeneration heater timer, and is deactivated prior to changeover. Desiccant 244 cools from its maximum temperature after heater 246 is deactivated.

It will be appreciated that valve rod 270 is disposed to connect second opening 228 of first tower 220 to air outlet 208. This is achieved by the positioning of first stop 274 in sealing contact with a first flange 278 intermediate the connection to second opening 228 and the end of plenum 266. Thus the airstream from second opening 228 of first tower 220 passes through process heater 205, over temperature sensor 410 and dew point sensor 420, and to outlet 208. If the temperature of air exiting outlet 208 must be kept suitably low, process heater 205 is switched off a few minutes before a changeover time when the towers are switched, thereby causing the metal components of process heater 205 to be cooled. Second opening 248 of second tower 240 is connected to a vent to the outside of dryer 200, by the positioning of second stop 276 in sealing contact with a second flange 280 intermediate the connection to air outlet 208 and the connection to the second opening 248 of second tower 240.

When, as explained above in connection with FIG. 1, it is desired to switch the towers, actuator 268 will be operated by a suitable controller to move valve rod 270. Valve rod 270 will be moved so as to cause first stop 278 and second stop 276 to move to the opposite side of the connections in plenum 266 to first tower 220 and second tower 240, respectively. As a result, the air stream from first tower 220 will be directed through plenum 266 to first vent 262. The air stream from second tower 240 will be directed through plenum 266 to air outlet 208. Thus, regenerated second desiccant 244 will remove moisture from the air stream. Heater 226 is activated, and first desiccant 224 is regenerated.

Second desiccant 244 will heat the air stream initially following the changeover. If process heater 205 has been cooled, heat will be transferred from the air stream to the metal portions of process heater 205, thereby cooling the air stream. The insulating layers of the two towers will perform the same function as in the embodiment of FIG. 1.

Figure 3:
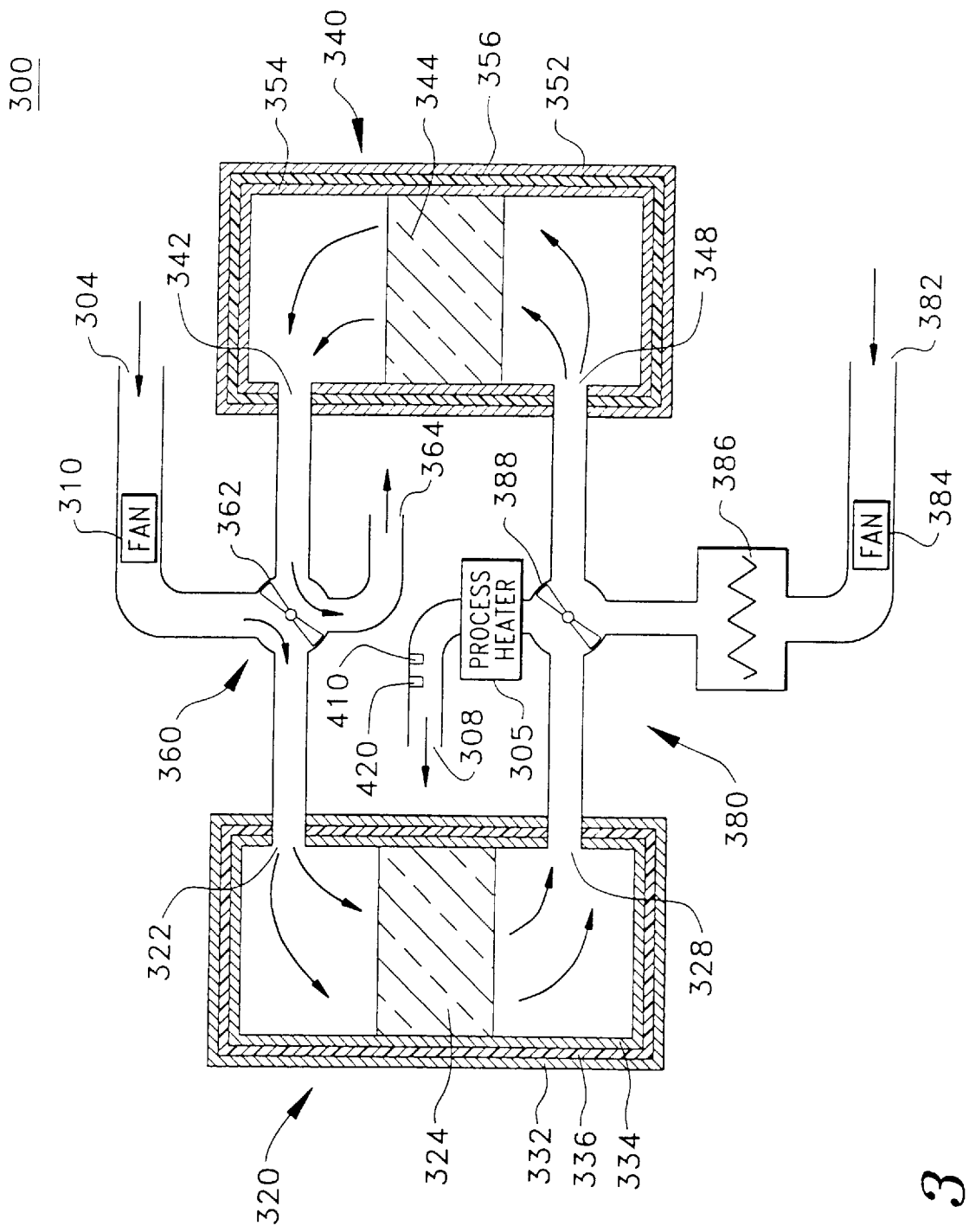
FIG. 3 is a partially schematic view of an apparatus according to an alternate embodiment of the invention.

Referring now to FIG. 3, there will be described a method and apparatus according to an alternate embodiment of the invention. FIG. 3 is a partially schematic view of an air dryer 300, or air drying system 300, according to the invention. Dryer 300 has an air inlet 304 and an air outlet 308. In operation, air inlet 304 and air outlet 308 would each be connected to opposite sides of an air stream in a process apparatus (not shown) which contains material which is to be dried or to be maintained in a dry state. Fan 310 is provided inward of air inlet 304. Air inlet 304 is thus a source of air flow into dryer 300.

Air inlet 304 is provided in physical communication with first air assembly 360. Air outlet 308 is provided in physical communication with second air assembly 380. There are defined, through first air assembly 360 and second air assembly 380, two air paths between air inlet 304 and air outlet 308. A first air path includes first tower 320. A second air path includes second tower 340.

First tower 320 has a first opening 322 at one end thereof and a second opening 328 at an opposite end thereof. A desiccant mass 324 is provided intermediate first opening 322 and second opening 328. First tower 320 may be a substantially cylindrical hollow body, having a generally cylindrical metal exterior wall 332, preferably of aluminum, an interior metal foil liner 334, preferably also of aluminum, and an insulating layer 336, disposed between exterior wall 332 and liner 334. As with the embodiment of FIG. 1, insulating layer 336 is preferably a one-half inch thick layer of a ceramic able to sustain a temperature differential of 400° F.

Second tower 340 has a first opening 342 at one end thereof and a second opening 348 at an opposite end thereof. A second desiccant 344 is disposed intermediate first opening 342 and second opening 348. Second tower 340 may also be a substantially cylindrical hollow body having a cylindrical metal exterior wall 352, preferably of aluminum, an interior metal foil liner 354, preferably also of aluminum, and insulating layer 356 intermediate exterior wall 352 and liner 354, preferably identical to insulating layer 336 of first tower 320.

First desiccant 324 and second desiccant 344 may be any one of a number of materials used as desiccants in the art. Examples of such materials are indicated above in connection with the description of the embodiment of FIG. 1. The quantity of desiccant per air flow rate is the same as that defined above, also in connection with the embodiment of FIG. 1.

First air assembly 360 includes four-way valve 362, which is in communication with air inlet 304, first opening 322 of first tower 320, first opening 342 of second tower 340, and a vent 364. First valve 362 is switchable between two states. First valve 362 is so disposed that in a first state, as shown in FIG. 3, a connection is provided between air inlet 304 and first opening 322 of first tower 320. In the first state, a connection is also provided between first opening 342 of second tower 340, and vent 364. In a second state, valve 362 provides a connection between air inlet 304 and first opening 342 of second tower 340, and a connection between first opening 322 of first tower 320, and vent 364. Either a single actuator, or commonly-controlled actuators, are provided so that first valve 362 and second valve 388 switch between their first and second states simultaneously. The reasons for the need for this configuration of controls for valves 362, 388 will become evident below in this portion of the detailed description.

Second air handling assembly 380 will now be described. Second air handling assembly 380 includes a room air inlet 382. Room air inlet 382 is disposed to receive air from the exterior of dryer 300, or any processing apparatus associated therewith. Immediately inward of room inlet 382 in a defined air path there is disposed a fan or blower 384. Inward of fan or blower 384, there is disposed heater 386. Heater 386 may be a conventional electric air heater.

Second air handling assembly 380 includes second valve 388. Second valve 388 is a four-way valve. Second valve 388 may be any one of a number commercially-available four-way valves used in air systems. Second valve 388 is connected to second opening 328 of first tower 320, second opening 348 of second tower 340, dryer air outlet 308, and room air inlet 382. Second valve 388 is switchable between first and second states. In its first state, which is illustrated in FIG. 3, second valve 388 is so disposed as to provide a connection between second opening 328 of first tower 320 and air outlet 308, and a connection between second opening 348 of second tower 340 and room air inlet 382. In its second state, second valve 388 provides a connection between second opening 328 of first tower 320 and room air inlet 382, and a connection between second opening 348 of second tower 340, and dryer air outlet 308.

Intermediate second valve 388 and outlet 308 there is disposed process heater 305. Process heater 305 is preferably configured identically to process heater 105 of the embodiment of FIG. 1. At least a portion of the exterior surface of process heater 305 preferably is disposed to the exterior of dryer 300. Temperature sensor 410 and dew point sensor 420 are disposed intermediate process heater 305 and outlet 308.

The operation of dryer 300 will now be explained. Air enters dryer 300 through air inlet 304. In conventional operation, the air entering air inlet 304 has exited a process apparatus, in which the air flows through a bed of material to be dried. Accordingly, the air entering dryer 300 and air inlet 304 has a high moisture content. As first valve 362 is in its first state, air entering through air inlet 304 proceeds from valve 362 into first opening 322 of first tower 320. The air flow then proceeds through desiccant 324 and exits tower 320 through second opening 328. The air flow then proceeds from second opening 328 to first valve 362. First valve 362 is in its first state, as explained above. Consequently, air entering first valve 362 from second opening 328 is directed to dryer air outlet 308. Conventionally, dryer air outlet 308 will be physically connected to an inlet of the processing apparatus (not shown). As the air flow is dried, to a desired extent or to a desired dew point, of retained moisture after passing through desiccant 324, the air exiting the system at air outlet 308 is in a dried state. Process heater 305, if activated, can be used to heat the air flow before the air flow exits at outlet 308. Process heater 305 may be switched off before the end of the cycle, and will then be cooled by the air stream. The air flow is in a suitable condition for drying materials in a process apparatus, or maintaining materials in a process apparatus at a desired degree of dryness.

In its first state, second valve 388, as noted above, also provides a connection between room air inlet 382 and second opening 348 of second tower 340. Fan 384 disposed inward of room air inlet 382 provides air flow through valve 388 and into second tower 340. The air flow from room inlet 382 may be heated, as desired, by heater 386. Heater 386 is preferably activated for a selected regeneration heater time, and then deactivated for a period of time prior to changeover. The air will then proceed into second tower 340 and through second desiccant 344. Second desiccant 344 is, at this time, in the regeneration portion of its cycle. That is, second desiccant 344 has become sufficiently saturated that it is no longer effective in removing moisture from the air. Second desiccant 344 is dried of retained moisture by the air flow provided from room inlet 382. After the air flow exits second desiccant 344, the air flow has a higher moisture content. As noted above, first valve 362 is in its first state, thereby connecting first opening 342 of second tower 340 to vent 364. The air flow from desiccant 344 thereby exits the dryer 300 at vent 364.

When it is desired to switch the two towers, and provide second tower 340 in the air flow between air inlet 304 and air outlet 308, and to regenerate first desiccant 324 of first tower 320, valves 362 and 388 are simultaneously switched from their first state to their second state. When the two valves are switched, air entering dryer 300 at air inlet 304 will be caused to flow, by fan 310, into first valve 362 and from first valve 362 into first opening 342 of second tower 340. The air flow from dryer inlet 304 will then proceed through desiccant 344 and will exit second tower 340 at the second opening 348 of second tower 340. The air flow will then enter second valve 388, and will be directed by second valve 388 to air outlet 308, where the air flow will then be reintroduced into a processing apparatus. If process heater 305 has been cooled prior to switching towers, the air stream will be cooled, as the metal of process heater 305 will serve as a heat sink. When the valves are in their second state, the air flow from room inlet 382 will be caused to flow by valve 384 over heater 386 and into second valve 388, which will direct the air flow to second opening 328 of the first tower 320. The air flow, suitably heated by heater 386 for a selected regeneration heating time after changeover, will then proceed through first desiccant 324, causing first desiccant 324 to be dried of retained moisture. The air flow will then exit first tower 320 at first opening 322, and will proceed into first valve 362. As first valve 362 is in its second state, the air flow from first tower 320 will be directed into vent 364, where the air flow will exit dryer 300.

It will be understood from the above description that dryers 100, 200, and 300 each provide suitable drying of air at flow rates of, for example, 50 CFM, while occupying a minimum of volume. The relatively low weight of desiccant required permits the use of a small volume of desiccant. As the desiccant volume is small, the towers can be made suitably smaller. It has been found, for example, that a system such as that illustrated in FIG. 1 having an air flow rate of approximately 50 CFM, can be housed in a cabinet having a height of approximately 33 inches, a width of approximately 14½ inches, and a length of approximately 22 inches. These dimensions are in contrast to the typical sizes of prior art air twin tower drying systems having a similar air flow rate capacity which, as indicated in the background of the invention, would typically have a height of about 6 feet, and length and width of approximately 3 feet. A system according to the invention having a capacity of approximately 30 CFM can be housed in a cabinet having a height of approximately 33 inches, a width of approximately 11.5 inches, and a length of approximately 20 inches. It has further been found that, contrary to the teachings of the art, the lifetime of desiccants is not as severely limited to the number of cycles in an apparatus of this type. For example, a system according to the invention, having an air flow rate of approximately 50 CFM, and a desiccant mass, in each tower, of approximately 3 pounds, may be run effectively at a total cycle time of 20 minutes. With a total cycle time of 20 minutes, the dryer is configured so that air from the dryer inlet is directed to one tower for approximately 10 minutes, while the desiccant in the other tower is regenerated, and then the towers are switched. It has been found, for example, that molecular sieve can effectively be run through in excess of 100,000 cycles. Typically, in the prior art, it was believed that molecular sieve could only be run through 10,000 to 20,000 cycles. Thus, while the desiccant must be replaced on a periodic basis, the expense and difficulty of doing so is small in comparison with the additional flexibility obtained by having a much smaller dryer unit in a processing facility where space is at a premium.

Substantial energy savings are also obtained from the system of the invention in comparison with prior art systems. As noted above, a heater having a maximum capacity of 1.5 kilowatts has been found satisfactory in systems according to the invention. In prior art systems, a maximum capacity of 1.5 kilowatts would have been entirely inadequate; in fact, heaters having a minimum capacity of 3.0 kilowatts are conventional in prior art systems.

The system of the invention is also advantageous over three or more tower systems of the prior art. Energy savings are obtained, as only two towers need be run. Additionally, the two tower system of the present invention has a smaller volume than a three tower system would.

Figure 4:
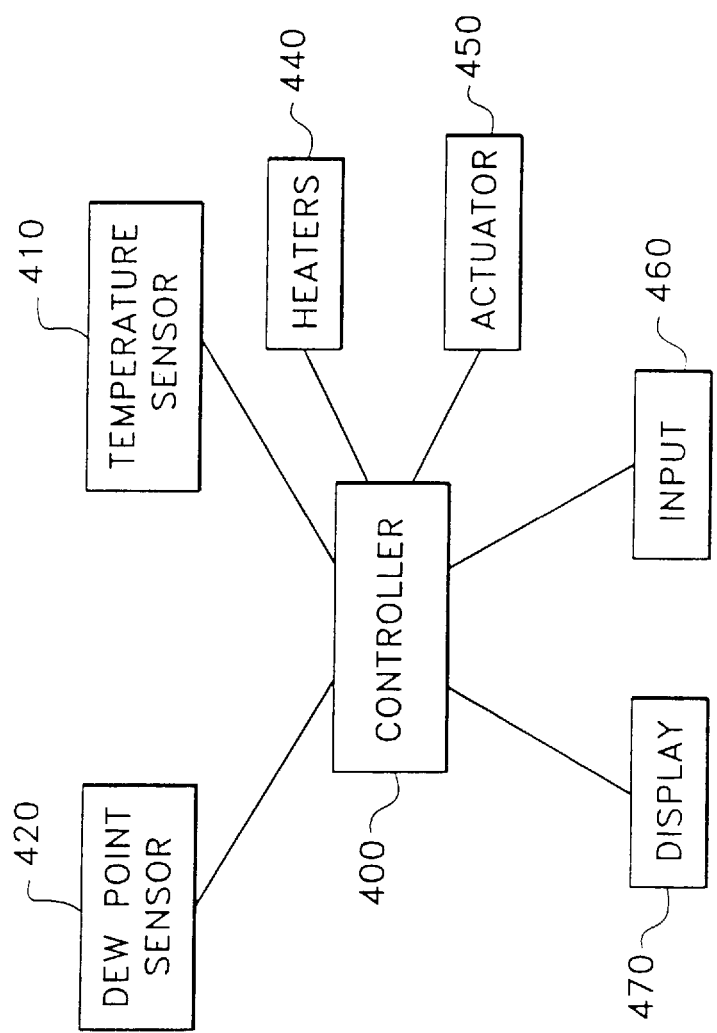
FIG. 4 is a block diagram of a control system in an apparatus according to the invention.

Referring now to FIG. 4, there will be explained a control apparatus for a system according to the invention. Controller 400 has appropriate data connections to a temperature sensor 410 and a dew point sensor 420. Controller 400 may be a standard IBM-compatible personal computer, or other personal computer, with suitable software, or may be a dedicated microprocessor-based controller. Through appropriate and conventional connections, controller 400 may control the operation of heaters 440 and a valve actuator 450. There is also provided a user interface, including a display 470, such as an LED display, and input 460, which may be a keypad.

Figure 5:
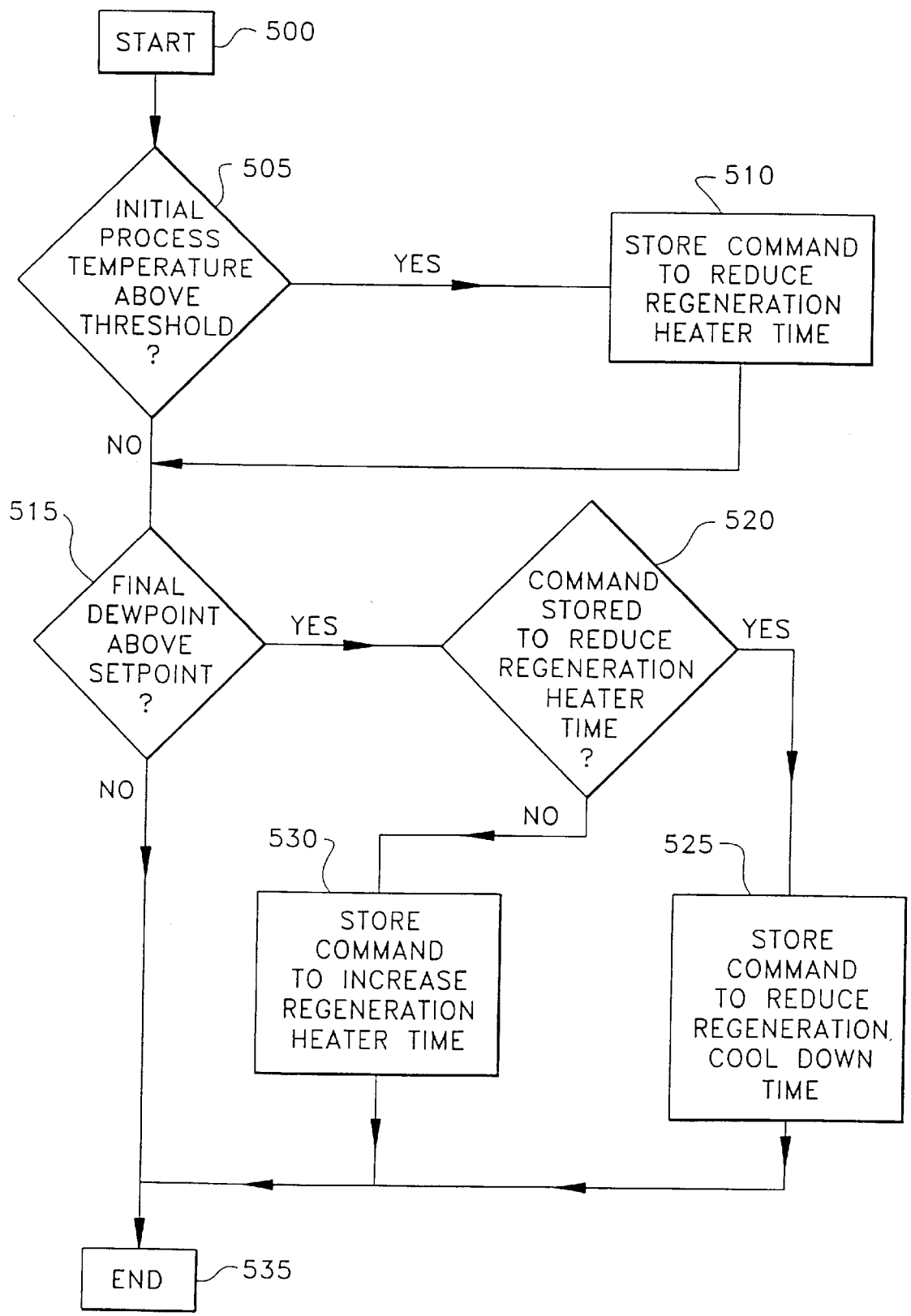
FIG. 5 is a flow chart of steps in control logic of a controller of an apparatus according to the invention.

Referring now to FIG. 5, there is shown a process flow diagram illustrating the logic, which may be programmed into software for a PC, or included in dedicated microprocessor hardware, for a controller 400 according to the invention. The cycle illustrated in FIG. 5 commences at the time the system switches towers. In the first step, the initial process or outlet temperature is compared to a stored desired process air temperature. This stored desired process air temperature has been selected by an operator before commencing operation of the system. The values of the desired process air temperature are provided to controller 400 through input 460. The operator also selects a desired maximum dew point temperature by input through input 460. Controller 400 may provide the selected temperature and dew point values to display 470.

In the first step of the method according to the invention, as illustrated in FIG. 5, which step is the first one following box 500, labelled START, the detected process temperature is compared to the set threshold temperature for the system. This step is illustrated in box 505, which is labeled INITIAL PROCESS TEMPERATURE ABOVE THRESHOLD? If the initial process temperature is above the threshold temperature, as illustrated by the arrow marked YES extending from box 505, then controller 400 stores a command to reduce heater time during the regeneration cycle. An initial heater time is stored permanently, either in software or hardware, depending upon the specific configuration of controller 400, for the system. The step of storing a command to reduce the heater time is indicated by box 510, which is labeled STORE COMMAND TO REDUCE REGENERATION HEATER TIME.

The next step after monitoring the temperature, and, if necessary, storing a command to reduce the heater time during the regeneration cycle, is comparing the detected final dew point to the set point dew point. This step is indicated by box 515, which is labeled FINAL DEW POINT ABOVE SET POINT? If the initial process temperature is not above the threshold, then the next step is the step of comparing the final dew point temperature to the dew point temperature. This progression is indicated by the arrow labeled NO leading from box 505 to box 515. If a command is stored to reduce the heater time during the regeneration cycle, then the next step is also to check whether the final dew point temperature is above the set point temperature. This progression is indicted by the arrow leading from box 510. It will be understood that the measurement of the final dew point for this step is carried out near the end of a cycle, at a selected time prior to the changeover from one tower to the other tower.

If the final dew point is above the set point, then the next step is to check whether a command has been stored to reduce the heater time of the regeneration cycle. This step is indicated by box 520, which is labeled COMMAND STORED TO REDUCE HEATER TIME? The progression from step 515 to box 520 is indicated by the arrow marked YES extending from box 515. If no command has been stored to reduce the heater time, then a command will be stored to increase the regeneration heater time. This step is indicated in box 530, which is labeled STORE COMMAND TO INCREASE REGENERATION HEATER TIME. The progression from determining whether a command has already been stored to reduce heater time to this step is indicated by the arrow labeled NO extending from box 520 to box 530. It will be appreciated that, by increasing the regeneration heater time, the desiccant will tend to be better dried. This drying effect will tend to reduce the final dew point.

If a command has been stored to reduce regeneration heater time, it is obviously not possible to increase heater time simultaneously. Consequently, in order to improve the final dew point, the period of time between the switching off of the heater and connecting the tower to the dryer outlet, must be decreased. This period of time is called the regeneration cool down time. The step of storing a command to decrease the regeneration cool down time is indicated at box 525, which is labeled STORE COMMAND TO INCREASE REGENERATION COOL DOWN TIME. The progression from the inquiry whether a command has been stored to reduce heater time to storing a command to decrease the regeneration cool down time is indicated by the arrow marked YES from box 520 to box 525. After either the step of storing a command to increase the regeneration heater time, or storing a command to decrease the cycle time, the logic then proceeds to the end of the cycle indicated by box 535, labelled END.

Figure 6:
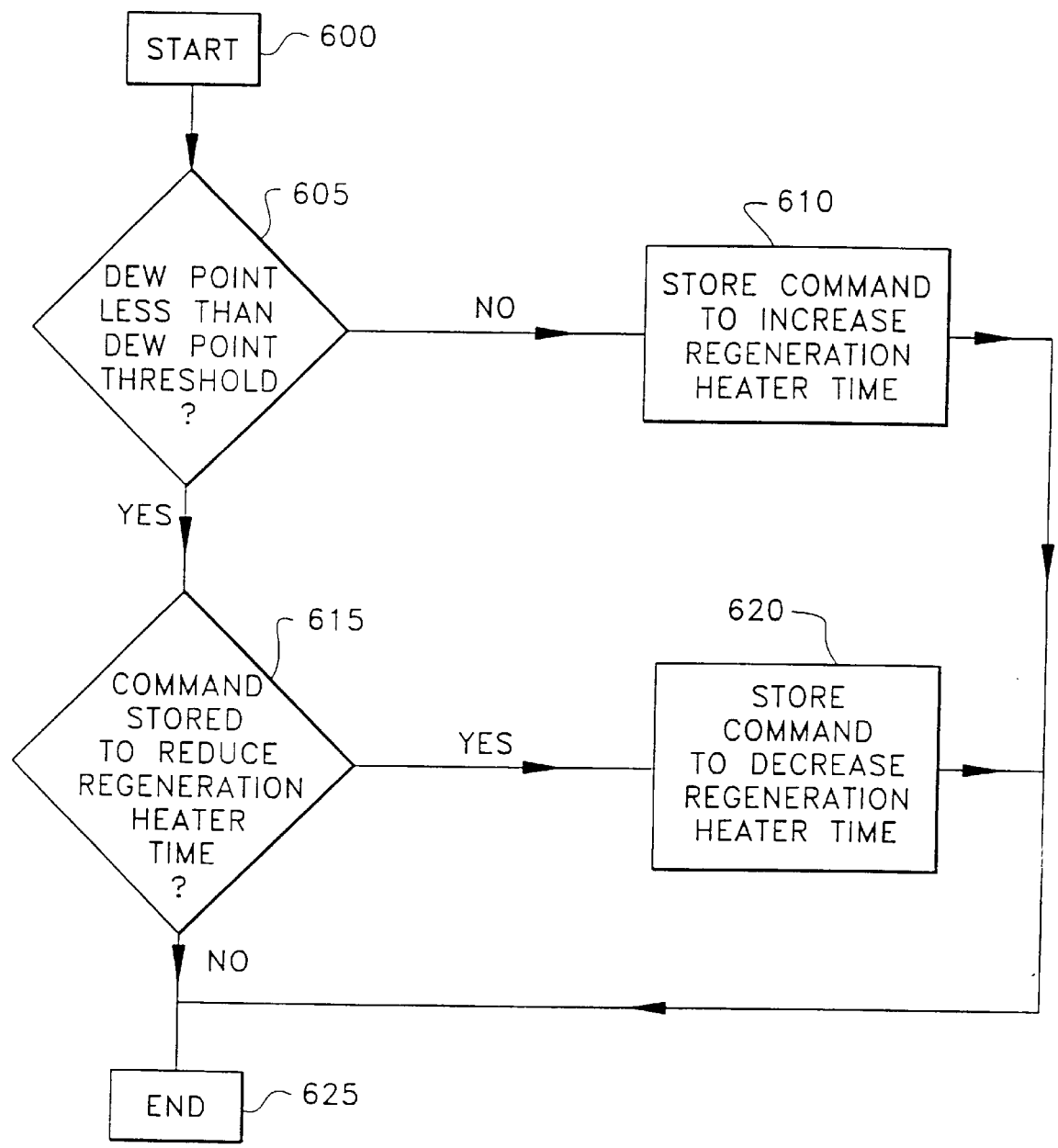
FIG. 6 is a flow chart of steps in control logic of an apparatus according to an alternate embodiment of the invention.

Referring now to FIG. 6, there is shown a process flow diagram illustrating an alternative logic for controller 400 according to the invention. The process illustrated in FIG. 6 provides continuous monitoring of the operation of a system according to the invention. Before the system is activated, an operator has selected a desired process air temperature, or outlet air temperature, and a desired dew point threshold. The values for the desired outlet air temperature and the desired dew point threshold are provided to controller 400 through input 460. Controller 400 may provide the selected temperature and dew point values to display 470.

In the first step according to the control method of the invention illustrated in FIG. 6, the detected dew point is continuously compared by controller 400 to the selected threshold dew point for the outlet. This step is illustrated in box 605, which is labelled DEW POINT LESS THAN DEW POINT THRESHOLD?. This step is the first step following the start of the process of FIG. 6, as indicated by box 600, which is labelled START. If at any time the detected dew point is found by controller 400 not to be below the dew point threshold, then controller 400 stores a command to increase the heater time for that tower, or for that bed of desiccant, during the regeneration cycle. A suitable algorithm, or look-up table may be provided to determine the increase in the regeneration heating time for a given discrepancy between the detected dew point and the dew point threshold. A simple approach is to increase regeneration heater time by a preselected period of time whenever a dew point in excess of the dew point threshold is detected. In one embodiment of the invention, a command is stored to increase regeneration heater time by 30 seconds, up to a selected maximum, after a dew point not less than the dew point threshold is detected. The selected maximum may be, for example, 12.5 minutes, where the initial regeneration heater time is 10 minutes. The step of storing the command to increase the heater time is indicated at box 610, which is labelled STORE COMMAND TO INCREASE REGENERATION HEATER TIME. The progression from the comparison step to the storing step is indicated by the arrow labelled NO leading from box 605 to box 610.

This process of FIG. 6 also compares the temperature immediately following the changeover to the new tower to the selected maximum or threshold temperature. The controller compares the detected outlet air temperature after the changeover time to the selected threshold temperature as indicated by box 615, which is labelled INITIAL PROCESS TEMPERATURE ABOVE THRESHOLD? If the detected outlet air temperature is above the threshold temperature, then controller 400 stores a command to decrease the heater time during the regeneration cycle. Controller 400 preferably looks to the peak temperature, and selects a decrease based on a suitable look-up table or algorithm. In a preferred embodiment, the ratio of decrease in regeneration heater time to excess of detected temperature over desired temperature may be, for a differential of less than 50 degrees, one second decrease for each degree in excess of the threshold; for a differential of 50 to less than 100 degrees, the regeneration heater time decrease may be 50 seconds, plus three-fifths of a second for each degree in excess of 50, to a preselected maximum regeneration heating time decrease of 80 degrees. A preselected minimum heater time is preferably also provided, regardless of the size of excess of the detected temperature over the desired temperature. The minimum regeneration heater time may be, for example, ten minutes. The step of decreasing the regeneration heater time is indicated by box 620, which is labelled STORE COMMAND TO REDUCE REGENERATION HEATER TIME. The progression from the step of comparing the detected outlet air temperature to the threshold temperature to the step of decreasing the regeneration heater time is indicated by the arrow marked YES extending from box 615 to box 620. As may be understood from FIG. 6, the flow of the process logic proceeds, if the detected temperature does not exceed the desired maximum or if either an increase or a decrease in the regeneration heater time has been set, to the end of the process, as indicated by box 625, marked END.

The process illustrated in FIG. 6 may operate during several cycles before an optimum regeneration heater time is selected. According to the process of FIG. 6, controller 400 maintains the bed regeneration cool down time constant. Consequently, the variations in the regeneration heater time result in variations in overall cycle time. In a preferred embodiment, the process of FIG. 6 is entirely separate for the two different towers in a system. Consequently, it is possible to have different regeneration heater times for the two towers in a single system. This is advantageous, as there may be slight differences in the weight of the desiccant masses in the two different towers.

Figure 7:
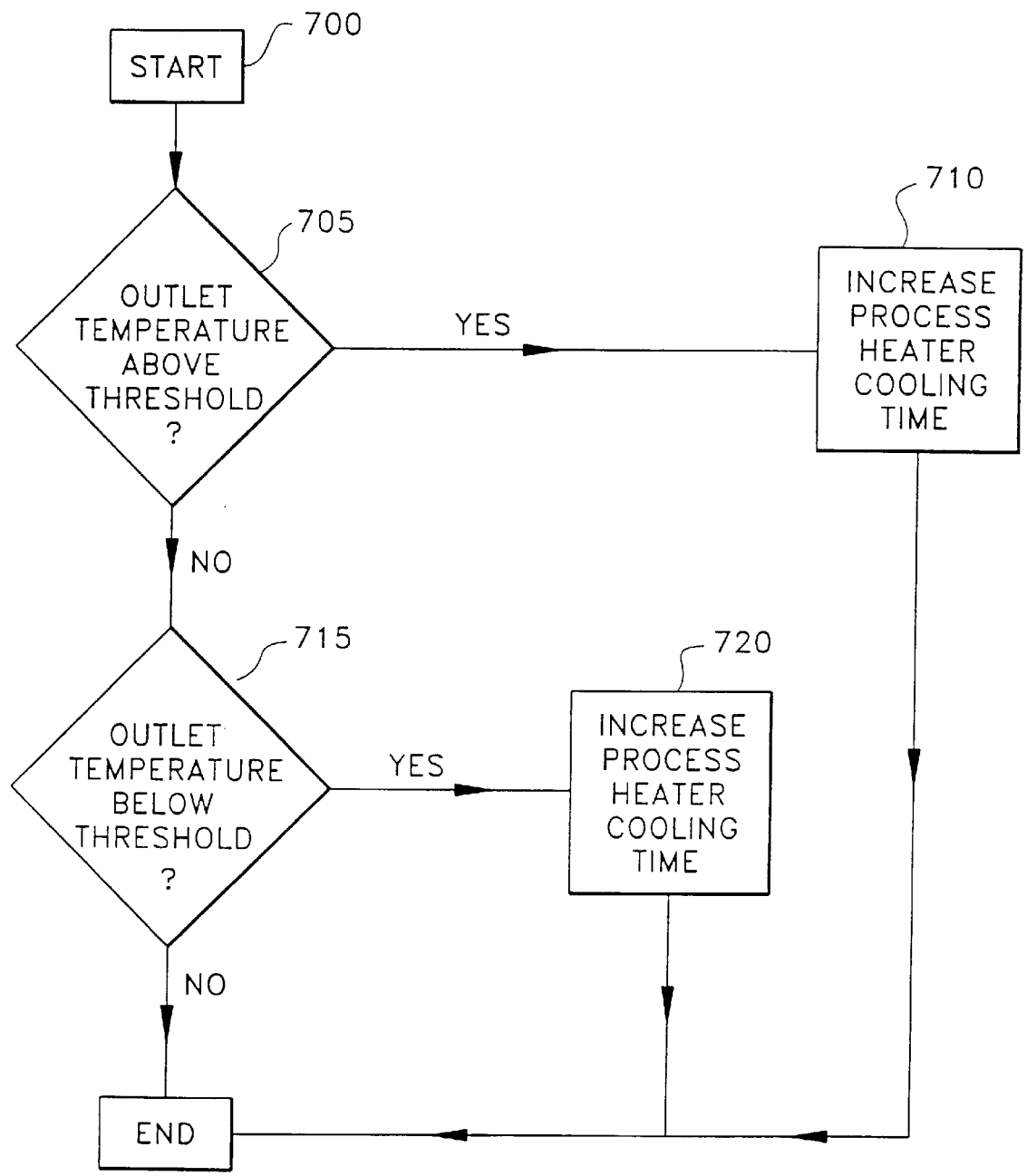
FIG. 7 is a flow chart of steps in control logic of an apparatus according to the invention.

Referring now to FIG. 7, there is shown a flow chart of process steps in a control system according to the invention. The control process of FIG. 7 is directed to adjusting the operating time of process heater 105 of FIG. 1, process heater 205 of FIG. 2, and process heater 305 of FIG. 3, so as to avoid providing air in excess of a preselected threshold temperature after the changeover between towers. Such excess temperature results from the elevated temperature of the desiccant beds.

The process begins with box 700, labeled START, and proceeds to compare the outlet air temperature detected by temperature sensor 410 to a preselected threshold temperature, as shown in box 705, labelled OUTLET TEMPERATURE ABOVE THRESHOLD? If the detected outlet air temperature exceeds the preselected threshold temperature, then the controller 400 will increase, or store a command to increase, the process heater cooling time. This is shown by the arrow marked YES leading from box 705 to box 710, which is labelled INCREASE PROCESS HEATER COOLING TIME. Preferably, an initial cooling time is set based on an algorithm or look-up table, based on the threshold temperature. For example, if the threshold temperature is 150° F., the initial cooling time may be 3 minutes. If the threshold temperature is 275° F., the initial cooling time may be 20 seconds; if the threshold temperature is 300° F., the initial cooling time may be zero. For example, a ratio may be selected, preferably in the range from about one-half second of cooling time increase per degree over the threshold temperature to about one and one-half seconds of cooling time increase per degree over the threshold. A maximum cooling time, such as three minutes, is preferably provided as well. The time the process heater is operating may be adjusted; however, the cycle time may vary, as a result of adjustments made in accordance with the method explained above in connection with FIG. 6. If the detected outlet temperature does not exceed the preselected threshold temperature, then the controller 400 determines whether the detected outlet temperature is below the preselected threshold temperature. This is shown by box 715, labelled OUTLET TEMPERATURE BELOW THRESHOLD? If the detected outlet temperature is below the preselected threshold temperature, then the controller 400 decreases the process heater cooling time, as shown by box 720, labelled DECREASE PROCESS HEATER COOLING TIME. The decrease is preferably by a ratio of time per degree below the threshold, such as the ratio used in increasing the cooling time. If the detected outlet temperature equal to the preselected threshold temperature, then the controller 400 proceeds to the end of the process, as shown by box 725, labelled END.

The process of FIG. 7 assures that the process heater is cooled the proper amount to cool the air received from a tower after the changeover, so as to obtain the threshold temperature. The process of FIG. 7 will usually operate through several cycles before approaching a final cooling time. It will be appreciated that if the threshold temperature is higher than the temperature of the air exiting the desiccant, this process will not be necessary.

According to the above processes, there are provided improved methods for monitoring a system according to the invention. By monitoring the initial process temperature, appropriate modifications to the regeneration cycle can be provided to assure that the initial temperature at the outlet is not excessive. The providing of a process heater which can serve as a heat sink, together with monitoring of outlet air temperature, provides additional control over the outlet temperature. Excessive outlet temperatures may be detrimental to materials which are being dried, or maintained in a dry state, in a process apparatus or a hopper. For example, if plastics in particulate form are being maintained in a dry state, an increase in temperature may result in the exterior surfaces of the particles becoming sticky, so that the particles will not flow as required for optimum process operation.

It will also be appreciated that the dew point must be kept at a sufficiently low value that the air that is outlet from the air dryer is capable of adequately drying materials. The method and system of the invention controls heating cycles to maintain the dew point at desired values.

It will be appreciated that there are considerable variations that can be accomplished in a method and apparatus of the invention without departing from its scope. As a result, although preferred embodiments of a method and apparatus of the invention have been described above, it is emphasized that the invention is not limited to a preferred embodiment and there exists other alternative embodiments that are fully encompassed within the invention's scope, which is intended to be limited only by the scope of the appended claims.

What is claimed is:

1. A method for dehumidifying air and providing dehumidified air to an outlet, comprising the step of:

continuously causing air selectively from either a first air path or a second air path to flow to the outlet so as to maintain a continuous flow of dehumidified air into the outlet;

wherein said first air path is characterized by having a first opening, a second opening, and a first desiccant mass intermediate said first opening and said second opening;

wherein said second air path is characterized by having a first opening, a second opening, and a second desiccant mass intermediate said first opening and said second opening; and wherein a ratio of the weight of both said first desiccant mass and said second desiccant mass to the flow rate to said outlet is not greater than about one pound per ten cubic feet per minute, wherein said step of causing air to flow comprises, the steps of (a) selectively causing air from said first air path to flow to said outlet for a selected time, then (b) causing air from said second air path to provide air to said process outlet for said selected time and repeating said step (a) and (b), said selected time being between about five minutes and about 30 minutes.

2. A method as for dehumidifying air and providing dehumidified air to an outlet, comprising the step of:

continuously causing air selectively from either a first air path or a second air path to flow to the outlet so as to maintain a continuous flow of dehumidified air into the outlet;

wherein said first air path is characterized by having a first opening, a second opening, and a first desiccant mass intermediate said first opening and said second opening;

wherein said second air path is characterized by having a first opening, a second opening, and a second desiccant mass intermediate said first opening and said second opening; and wherein a ratio of the weight of both said first desiccant mass and said second desiccant mass to the flow rate to said outlet is not greater than one pound per ten cubic feet per minute, further comprising the steps of providing a flow of heated air through said one of said first and second desiccant masses which is in said one of said first and second air paths from which air is not selectively flowing to said outlet, for a selected regeneration heating time, detecting the temperature of air of the outlet at a selected time; comparing said detected outlet air temperature to a preselected threshold temperature; and, if said detected outlet air temperature exceeds said preselected threshold temperature, reducing said selected regeneration heating time.

3. A method as recited in claim 2, further comprising the steps of detecting the dew point of air at the outlet, comparing said detected outlet air dew point to a preselected threshold dew point, and, if said detected outlet air dew point is not less than said preselected threshold dew point, either, if said selected regeneration heating time has not been reduced subsequent to said step of comparing said detected outlet air temperature to said preselected threshold temperature, increasing said selected regeneration heating time, or, if said selected regeneration heating time has been reduced subsequent to said step of comparing said detected outlet air temperature to said preselected threshold temperature, decreasing a preselected cool down time during which a flow of unheated air is provided through said one of said first and second desiccant masses which is in said one of said first and second air paths from which air is not selectively flowing to said outlet.

4. An apparatus for dehumidifying air and providing dehumidified air to an outlet, comprising:

(a) a first air path, comprising a first opening, a second opening, and a first desiccant mass intermediate said first opening and said second opening;

(b) a second air path, comprising a first opening, a second opening and a second desiccant mass intermediate said first opening and said second opening; and (c) means for continuously causing air selectively from either said first air path only or said second air path only to flow to the outlet, so as to maintain a continuous flow of dehumidified air into the outlet;

wherein the ratio of the weight of each of said first desiccant mass and said second desiccant mass to the air flow rate into the outlet is not greater than one pound per ten cubic feet per minute, wherein said air flow means comprises means for (a) selectively causing air from said first air path to flow to said outlet for a selected time, for then (b) causing air from said second air path to provide air to said process outlet for said selected time, and for repeating said (a) and said (b), said selected time being between about five minutes and about thirty minutes in length.

5. An apparatus as recited in claim 4, further comprising means for detecting the dew point of air at the outlet, and wherein said control means further comprises (i) means for comparing said detected outlet air dew point to a preselected threshold dew point, (ii) means for, if said detected outlet air dew point is not less than said preselected threshold dew point, either, if said selected regeneration heating time has not been reduced by said control means subsequent to comparing said detected outlet air temperature to said preselected threshold temperature, increasing said selected regeneration time, and (iii) means for, if said selected regeneration time has been reduced by said control means subsequent to comparing said detected outlet air temperature to said preselected threshold temperature, decreasing a preselected cool down time during which a flow of unheated air is provided through said one of said first and second desiccant masses which is in said one of said first and second air paths from which air is not selectively flowing to said outlet.

6. An apparatus for dehumidifying air and providing dehumidified air to an outlet, comprising:

(a) a first air path, comprising a first opening, a second opening, and a first desiccant mass intermediate said first opening and said second opening; (b) a second air path, comprising a first opening, a second opening and a second desiccant mass intermnediate said first opening and said second opening; and (c) means for continuously causing air selectively from either said first air path only or said second air path only to flow to the outlet, so as to maintain a continuous flow of dehumidified air into the outlet;

wherein the ratio of the weight of each of said first desiccant mass and said second desiccant mass to the air flow rate into the outlet is not greater than one pound per ten cubic feet per minute, further comprising means for providing a flow of heated air through said one of said first and second desiccant masses which is in said one of said first and second air paths from which air is not selectively flowing to said outlet, for a selected regeneration heating time; means for detecting the temperature of air at the outlet at a selected time; and control means for comparing said detected outlet temperature to a preselected threshold temperature, and, if said detected outlet air temperature exceeds said preselected threshold temperature, reducing said selected regeneration heating time.

* * * * *